July 17, 1956
G. J. PLEMENG
2,754,535
FRAMELESS PLATE GLASS DOOR HANGER
Filed Aug. 10, 1953
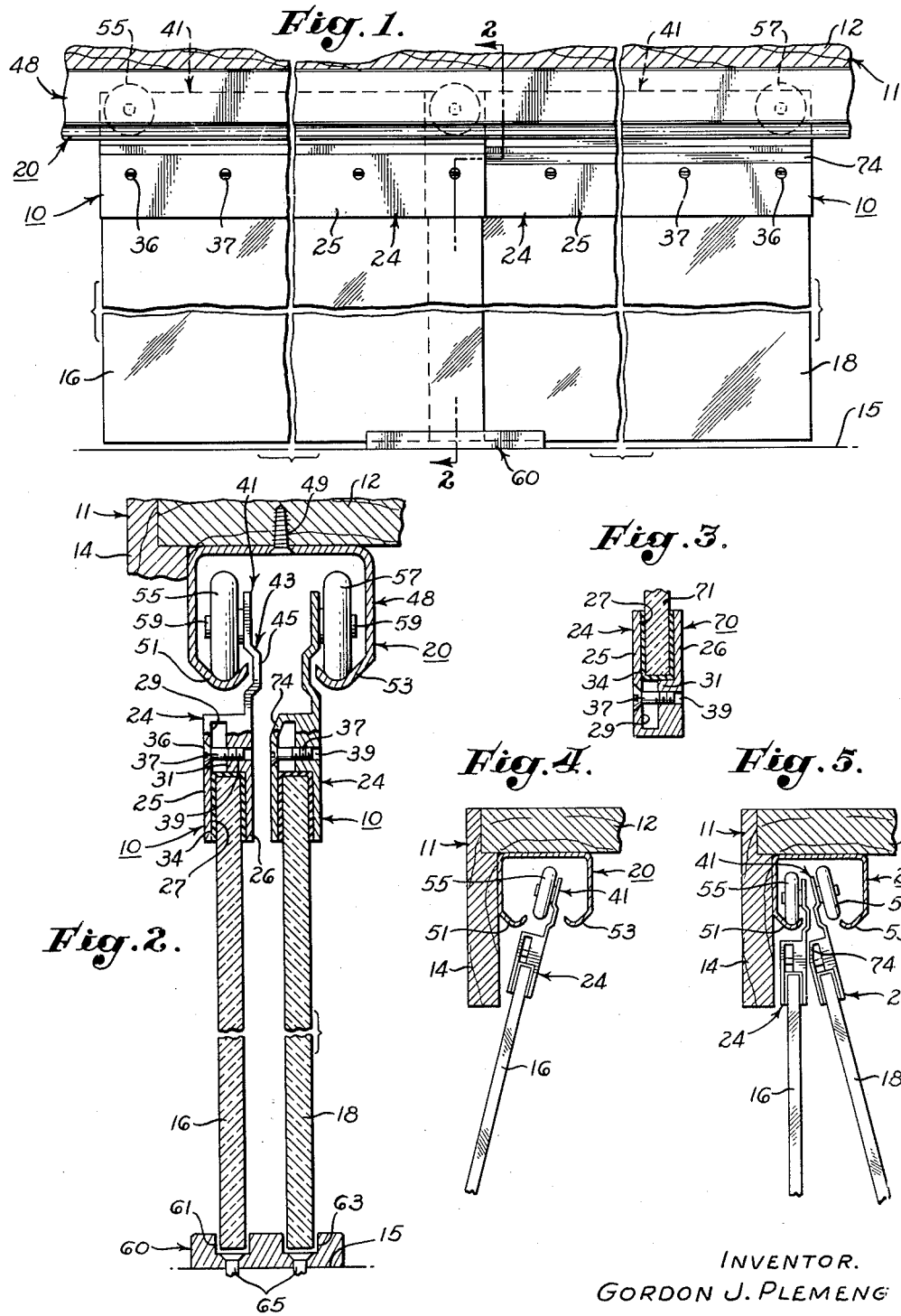
INVENTOR.
GORDON J. PLEMENG
BY Thomas P. Mahoney
ATTORNEY.

United States Patent Office 2,754,535
Patented July 17, 1956

2,754,535

FRAMELESS PLATE GLASS DOOR HANGER

Gordon J. Plemeng, Burbank, Calif.

Application August 10, 1953, Serial No. 373,312

2 Claims. (Cl. 16—87)

This invention relates to a hanger or support for a frameless glass closure and, more particularly, to a support designed to engage an edge of a frameless sheet of glass to support the same in operative relation with an opening.

In order to facilitate the disclosure of the construction and mode of operation of my invention, it will be described as embodied in a support construction designed to be utilized in conjunction with showcases and similar articles but it is, of course, to be understood that the principles of my invention may be applied with equal cogency in other applications, such as sliding glass doors and windows.

While the use of unframed sheets of glass as closures for openings is not unknown in the prior art, it has been conventional practice to mount such sheets of glass in a support constituted by an elongated channel member into which an edge of the sheet of glass is forced and in which said edge is retained by the utilization of adhesives. The utilization of such conventional supports has several inherent disadvantages, among which is the fact that when a sheet of glass mounted in a conventional support of the above described character is broken or cracked, it is practically impossible to remove the sheet of glass from operative relation with the support without so damaging the support as to render it useless. Furthermore, conventional adhesives or binders, such as litharge, frequently dry out resulting in the loosening of the edge of the sheet of glass from the channel and breakage thereof.

Furthermore, the installation of a sheet of glass in conventional support constructions is a time-consuming and difficult task, frequently necessitating the services of a professional glazer and thus resulting in relatively high original installation and maintenance costs.

It is, therefore, an object of my invention to provide a support for a frameless glass closure which includes an elongated member providing an elongated channel for receiving an edge of said closure, said channel being defined by laterally spaced side walls and one of said side walls being movable by means associated therewith into frictional engagement with the edge of said closure to securely retain said closure in said channel.

An additional object of my invention is the provision of a support for a frameless glass closure which includes an elongated member of the aforementioned character, the movable side wall of which is urgeable into engagement with an associated edge of the glass closure by means of a rotatable member operatively connected between the movable side wall and the oppositely disposed side wall.

Another object of my invention is the provision of a support for a frameless glass closure which eliminates the necessity for the use of binders or adhesives and which permits the glass closure to be so easily installed that the necessity for the services of a glazer is eliminated, thus materially reducing the installation and maintenance costs thereof.

A further object of my invention is the provision of a support for a frameless glass closure which is so constructed, by virtue of the movable side wall thereof, that damaged glass can be readily removed from operative relation therewith to permit the installation of a new glass closure therein.

A further object of my invention is the provision of a suspensory structure for a frameless glass closure which incorporates a support of the aforementioned character, said support having provided thereupon an elongated supporting arm which has operatively connected thereto suspensory means engageable with a supporting track.

Another object of my invention is the provision of a suspensory structure of the aforementioned character wherein the aforesaid supporting arm is provided with clearance means adapted to receive a lateral edge of the adjacent track, said clearance means being constituted by an elongated groove provided in the supporting arm.

An additional object of my invention is the provision in a suspensory structure of the aforementioned character of an elongated member providing a channel for receiving the edge of an associated frameless glass closure, said channel incorporating stop means engageable by the edge of the frameless glass closure to limit the movement of said edge into said channel and to provide a secure abutment therefor.

Another object of my invention is the provision of a suspensory structure which incorporates a track member, said track member providing a pair of oppositely disposed tracks for supporting a pair of elongated members, each of which provides an elongated channel defined by a movable side wall and a fixed side wall, the moveable side wall being urgeable toward the fixed side wall to frictionally engage an associated edge of a glass closure and to retain the glass closure in operative relation with said elongated member.

An additional object of my invention is the provision of a suspensory structure of the aforementioned character wherein one of the pair of elongated members is provided with a bevel adjacent the upper edge thereof to facilitate the installation of said one member and its associated glass closure in operative relation with its associated elongated member and glass closure.

Another object of my invention is the provision of a suspensory structure of the aforementioned character which can be readily installed in existing equipment and which facilitates the easy removal of the glass closures from the associated track member for repair.

A further object of my invention is the provision of a suspensory structure of the aforementioned character which can be easily and cheaply manufactured and which includes a minimum number of constituent parts.

Other objects and advantages of my invention will be apparent from the following specification and the accompanying drawing which is for the purpose of illustration only and in which:

Fig. 1 is a front elevational view showing a support for a frameless glass closure constructed in accordance with my invention;

Fig. 2 is a vertical sectional view taken on the broken line 2—2 of Fig. 1;

Fig. 3 is a fragmentary view showing an elongated member constructed in accordance with my invention supporting the lower edge of a frameless glass closure;

Fig. 4 is a fragmentary, partly sectional view showing the mode of installation of a frameless glass closure mounted in a support of my invention; and Fig. 5 is a view similar to Fig. 4 showing the installation of an associated frameless glass closure to illustrate the manner in which a pair of frameless glass closures mounted upon the support and suspensory structure of my invention may be installed in operative relation with a track member.

Referring to the drawing, and particularly to Figs. 1 and 2 thereof, I show a pair of hangers or supports 10 for frameless glass closures installed in a showcase 11, said showcase including a ceiling 12 and a front cornice 14 operatively attached thereto to define an opening 15 which has a pair of frameless glass closures 16 and 18 operatively suspended therein. The glass closure 16 constitutes the front closure and the glass closure 18 constitutes the rear closure of the pair and the closures 16 and 18 are movable relative to each other across the opening 15 in the showcase 11 by virtue of their being mounted in a suspensory structure 20 which incorporates the supports 10 of my invention.

The frameless glass closures 16 and 18 each have their uppermost edges mounted in a support 10 constructed in accordance with my invention, each of the supports 10 being substantially identical in construction with a variation in the construction of the support 10 for the rear closure 18 which will be adverted to in considering the mode of operation thereof hereinbelow. Since, however, the supports 10 are substantially identical in construction and mode of operation, only the support 10 from which the front closure 16 is suspended will be described in detail.

The support 10 includes an elongated member 24, said elongated member including side walls 25 and 26 which are laterally spaced from each other to provide an elongated channel 27, said channel being designed to receive the upper edge of the associated glass closure 16. An elongated space 29 is provided in the member 24 which communicates with the channel 27 and a shoulder 31 or stop is provided on the interior of the side wall 26 to serve as an abutment for the extreme upper edge of the closure 16.

The side wall 25 of the elongated member 24 is movable relatively to the side wall 26 of the elongated member so that when the upper edge of the closure 16 is disposed in the channel 27, the side wall 25 will frictionally engage said upper edge and urge it into frictional engagement with the oppositely disposed rigid side wall 26. However, in order to facilitate the installation of the upper edge of the closure 16 in the channel 27, a strip of tape 34 is wrapped about said edge prior to its installation in the channel 27, said strip of tape tending to increase the frictional engagement between the side walls 25 and 26 of the elongated member 24 with the upper edge of the closure 16.

It will be noted that the extreme upper edge of the closure 16 abuts on the strip of tape 34 which, in turn, engages the shoulder 31 to locate the upper edge of the closure 16 within the channel 27.

In order that the movable side wall 25 may be urged into frictional engagement with the upper edge of the closure 16 and, more particularly, with the tape surrounding said upper edge, rotatable members 36, constituted in the present instance by screws 37, are engaged with the side wall 25 and the oppositely disposed shoulder portion 31 of the side wall 26. A plurality of threaded bores 39 is provided in the shoulder portion 31 and are engaged by the threaded shanks of the screws 37. Therefore, when the screws 37 are rotated in an appropriate direction, the movable wall 25 is urged in a direction toward the fixed wall 26 to securely bind the upper edge of the closure 16 in the channel 27. Thus, the installation of the closure 16 in the channel 27 in the elongated member 24 merely entails the rotation of the screws 37 in an appropriate direction to permit the insertion of the upper edge of the closure 16 with the tape 34 deposited thereupon in the channel 27. When the upper edge of the closure 16 and the tape 34 thereupon abuts on the shoulder portion 31 of the fixed wall 26, the screws 37 are tightened in the bores 39 to draw the movable wall 25 toward the fixed wall 26 and bind the upper edge of the closure 16 in the channel 27.

Conversely, when it is desired to remove the closure 16 from the channel 27, it is merely necessary to release the screws 37 and withdraw the closure 16 therefrom so that the services of a glazer are not required and installation of a new closure is facilitated.

Although I have shown the movable side wall 25 as being urgeable into frictional engagement with an adjacent edge of the glass closure 16 by means of screws 37, it is, of course, conceivable that other means than the screws 37 may be used to urge the movable wall 25 into operative engagement with the upper edge of the closure 16 and I do not intend to be limited to the specific rotatable means shown.

Formed integrally with the upper portion of the elongated member 24 is an elongated supporting arm 41, said supporting arm being of the same length as the elongated member and including clearance means 43, said clearance means being constituted by an elongated, offset portion 45 which provides a continuous groove in the elongated supporting arm 41, for a purpose which will be adverted to in greater detail below.

A track member 48 which constitutes a portion of the suspensory structure 20 of my invention is secured to the underside of the showcase ceiling 12 by means of screws 49, or similar fasteners. The track member 48 provides oppositely disposed, laterally spaced, substantially U-shaped tracks 51 and 53 which are, respectively, resigned to receive roller wheels 55 and 57 formed of "nylon," or any other suitable material, and mounted for rotation on the supporting arm 41 by means of shafts 59.

It will be noted that the lateral edge of the track 51 is receivable in the elongated axial groove provided by the clearance means 43 on the elongated supporting arm 41, thus materially reducing the space occupied by the supporting arm 41 and also facilitating the suspension of the elongated member 24 and its associated glass closure 16 at a point directly below the point of affixation of the supporting arm 41 to the roller wheels 55.

It should also be noted that the provision of clearance means 43 in the elongated supporting arms 41 facilitates the installation of the supporting arms 41 and their associated roller wheels 55 and 57 in their associated tracks 51 and 53, since, as will be more clearly shown below, the reduced dimension of the supporting arms 41, due to the provision of the clearance means 43, prevents the supporting arms from engaging one another during the installation process.

A lower guide block 60 is provided on the bottom wall of the showcase 11 and incorporates elongated grooves which provide tracks 61 and 63 for the lowermost edges of the glass closures 16 and 18, respectively. The guide block 60 may be fastened to the bottom of the showcase 11 by means of screws 65, or similar fasteners. It is, therefore, readily apparent that there is no necessity for providing grooves in the bottom wall of the showcase 11 since a relatively short length of guide block 60 will serve the function of guiding the lowermost edges of the glass closures 16 and 18. Furthermore, the major portion of the suspensory structure 20, including the track member 48 and the supporting arm 41 and roller wheels 55 and 57, is completely concealed from view behind the front cornice 14 of the showcase 11.

In addition, the ease of installation inherent in the construction of the elongated member 24 constituting the support 10 materially reduces installation and replacement costs and also permits the conversion of existing showcases to the presently disclosed invention with a minimum expenditure of time and effort.

In Fig. 3 of the drawing an alternative construction of the elongated member 24 of my invention is exemplified as a support 70 for a frameless glass closure 71. The major distinction between the support 70 and the support 10 previously discussed is that the support 70 is designed to support the lowermost edge of a glass closure 71 and, therefore, the elongated member 24 constituting the same is not provided with the elongated supporting arm 41 and the remainder of the suspensory structure 20 previously described in discussing the above disclosed embodiment of the invention.

The support 70 is designed to be utilized in supporting the frameless glass closure 71 at the bottom thereof and to be incorporated in such installations as vertically movable automobile windows and similar applications.

The steps of installing the closures 16 and 18 in the showcase 11 are best shown in Figs. 4 and 5 of the drawing. In Fig. 4 of the drawing, the front closure 16 is shown in the process of installation on its associated track 51, the elongated supporting arm 41 thereof being inserted in the space between the tracks 51 and 53 by slightly tilting the closure 16 and grasping it by its lateral edges. The supporting arm 41, after it has entered the space between the tracks 51 and 53, is then moved into the vertical position and brought into registry with the track 51 so that the roller wheels 55 thereupon may be seated in the track 51.

In order to facilitate the installation of the rear closure 18 after the front closure 16 has been hung, it has been discovered that it is desirable to set the rear closure against the back of the showcase before hanging the front closure 16 in the above described manner.

Subsequently, the rear closure 18 is grasped at its lateral edges and tilted into the position shown in Fig. 5 of the drawing. When so tilted, a beveled portion 74 thereupon permits the elongated member 24 which supports the rear closure 18 to be cocked in the manner shown in Fig. 5 of the drawing and, nevertheless, clear the elongated member 24 associated with the front closure 16. Therefore, both the front closure 16 and the rear closure 18 can be readily installed on the respective tracks 51 and 53 without utilization of tools of any kind and the removal thereof can be as readily accomplished by raising each of the closures to clear the lower guide block 60 and removing them in the same manner as they were originally installed, but in reverse, that is, removing the front closure 16 first and then subsequently removing the rear closure 18.

After the front and rear closures 16 and 18 have been properly installed in accordance with the above described method of installation, they are suspended in parallelism with their lowermost edges disposed in the tracks 61 and 63 of the guide block 60.

It should be noted that the construction of the support 10 and the suspensory structure 20 permits the front and rear closures 16 and 18 to be located at the extreme forward edge of the showcase 11, thus consuming a minimum amount of usable space within the showcase itself.

I thus provide by my invention a support for frameless glass closures and a suspensory structure incorporating the same which include a minimum number of parts and which do not require any modification of the glass closures to mount the same. In addition, the installation of a frameless glass closure in the support of my invention can be accomplished with a minimum of time and effort and does not entail the survices of a glazer. The closure mounted on the support and suspensory structure of my invention can be readily installed and removed without the necessity for the use of tools and can be replace, if damaged, without in any way damaging the support of my invention.

I claim as my invention:

1. A frame member for supporting a sheet of glass at one edge thereof comprising an elongated bar member having a pair of substantially flat faces and upper and lower sides, an integral flange extending from said upper side as an extension of one of said faces, a jog in said flange intermediate its outer extremity and its point of attachment to said upper side, at least a pair of rollers pivotally attached to said flange above said jog, said rollers being adapted to roll on a track and said jog being adapted to provide clearance around an edge of said track, said bar member being grooved from its lower side so as to define a pair of side walls, the grooving adjacent one side wall being shallower than the grooving adjacent the other side wall to define an integral solid base portion extending along one side wall for abutting the edge of a sheet of glass received between said side walls, and rotatable means extending through one side wall and into said base portion to draw said side walls toward one another.

2. A frame member for supporting a sheet of glass at one edge thereof comprising an elongated bar member having a pair of substantially flat faces and upper and lower sides, an integral flange extending from said upper side as an extension of one of said faces, a jog in said flange intermediate its outer extremity and its point of attachment to said upper side, at least a pair of rollers pivotally attached to said flange above said jog, said rollers being adapted to roll on a track and said jog being adapted to provide clearance around an edge of said track, said bar member being grooved from its lower side so as to define a pair of side walls, the grooving adjacent the side wall associated with said one of said faces being shallower than the grooving adjacent the other side wall to define an integral solid base portion extending along said side wall associated with said one of said faces for abutting the edge of a sheet of glass received between said side walls, and rotatable means extending through one side wall and into said base portion to draw said side walls toward one another.

References Cited in the file of this patent

UNITED STATES PATENTS

| | | |
|---|---|---|
| 1,294,589 | Wolfe | Feb. 18, 1919 |
| 2,126,111 | Holderle et al. | Aug. 9, 1938 |
| 2,534,687 | Smith | Dec. 19, 1950 |
| 2,600,670 | Minium | June 17, 1952 |
| 2,637,422 | Bell | May 5, 1953 |